(12) United States Patent
Berthiaume et al.

(10) Patent No.: US 9,008,432 B2
(45) Date of Patent: Apr. 14, 2015

(54) CODED VISUAL INFORMATION SYSTEM

(75) Inventors: Jeffrey Berthiaume, Dallas, TX (US);
John Ellis Stafira, Dallas, TX (US);
Mark Alexander Stafford, Dallas, TX (US)

(73) Assignee: Qyoo, LLC., Dallas, TX (US)

( * ) Notice: Subject to any disclaimer, the term of this patent is extended or adjusted under 35 U.S.C. 154(b) by 972 days.

(21) Appl. No.: 12/964,987

(22) Filed: Dec. 10, 2010

(65) Prior Publication Data
US 2011/0149090 A1  Jun. 23, 2011

Related U.S. Application Data

(60) Provisional application No. 61/289,607, filed on Dec. 23, 2009.

(51) Int. Cl.
*G06K 9/46* (2006.01)
*G06K 9/66* (2006.01)
*G06K 19/06* (2006.01)

(52) U.S. Cl.
CPC ............................... *G06K 19/06009* (2013.01)

(58) Field of Classification Search
CPC . G06K 19/06009; G06K 9/46; G06K 7/1417; G06K 19/04; H04N 5/225; H04N 2201/3269; B01J 2219/00547; B01J 2219/00549
USPC .......................................... 235/494; 382/190
See application file for complete search history.

(56) References Cited

U.S. PATENT DOCUMENTS

| | | | | |
|---|---|---|---|---|
| 6,264,106 | B1 * | 7/2001 | Bridgelall | 235/462.46 |
| 6,622,923 | B1 * | 9/2003 | Walmsley et al. | 235/494 |
| 7,378,966 | B2 * | 5/2008 | Agarwal et al. | 340/572.1 |
| 7,571,864 | B2 * | 8/2009 | Kiliccote | 235/494 |
| 2005/0061892 | A1 * | 3/2005 | Lapstun et al. | 235/494 |
| 2008/0267504 | A1 * | 10/2008 | Schloter et al. | 382/181 |
| 2009/0090786 | A1 * | 4/2009 | Hovis | 235/494 |

OTHER PUBLICATIONS

Casselman, "How to Read QR Symbols Without Your Mobile Telephone", 2013.*
ISO (Information technology-Automatic identification and data capture techniques—Bar code symbology—QR Code (2000)).*

* cited by examiner

*Primary Examiner* — John Strege
(74) *Attorney, Agent, or Firm* — Greenblum & Bernstein, P.L.C.

(57) ABSTRACT

Information is arranged within a predetermined shape. The predetermined shape is captured in an image taken by a tangible image-capturing element of a device which captures images at the direction of a user. The device includes a tangible processor that analyzes the image captured by the image-capturing element to determine whether a predetermined shape is present in the image. The tangible processor determines an alignment of the predetermined shape when the predetermined shape is present in the image, and reads data within the predetermined shape in accordance with the determined alignment. The device automatically forwards a request for content over a communications network in accordance with the data read within the predetermined shape. The device receives the content over the network and displays the content.

20 Claims, 7 Drawing Sheets

CODED VISUAL INFORMATION SYSTEM

CROSS-REFERENCE TO RELATED APPLICATIONS

This application claims the benefit of U.S. Provisional Patent Application No. 61/289,607, filed on Dec. 23, 2009, the disclosure of which is expressly incorporated herein by reference in its entirety.

BACKGROUND

1. Field of the Disclosure

The present disclosure relates to coded visual information systems. More particularly, the present disclosure relates to two-dimensional coded visual information systems for associating information about items with unique two-dimensional coded visual information marks.

2. Background Information

One-dimensional coded visual information systems such as bar code systems are used to mark products with unique values for subsequent identification. An example of a bar code system is a universal product code (UPC) system. Bar codes are series of vertical bars of different widths arranged in parallel. The width of a bar evidences the value of the bar, and a bar code reader can read values of a series of sequential vertical bars of different widths arranged in parallel by scanning the series of vertical bars. The value read by a bar code reader can be associated with information such as a product identification and price via a centralized database.

Two-dimensional systems have also been developed, and these so-called quick response (QR) codes are intended to allow content of a two-dimensional code to be decoded visually at high speed. As with the one-dimensional systems, the content of a two-dimensional code may be a unique value assigned to mark products with unique values for subsequent identification. The value read by a QR code reader can be then associated with information such as a product identification and price.

QR codes have advanced so far that they are now used to identify text, such as addresses and uniform resource locators (URLs). Such QR codes can be placed as visual advertising or as a marker to identify a particular object. Camera phones equipped with reader software can recognize an image of a QR code and, upon recognition, a browser on the camera phone may be launched and directed to a uniform resource locator pointed to by the QR code. The linkage between a uniform resource locator and a two-dimensional code used to mark a physical object has come to be known as a hardlink.

DETAILED DESCRIPTION

In view of the foregoing, the present disclosure, through one or more of its various aspects, embodiments and/or specific features or sub-components, is thus intended to bring out one or more of the advantages as specifically noted below.

A qyoo can be in any two colors, as long as those colors are high-contrast. A qyoo can be printed or displayed in any size. However, it is recommended that qyoos be printed no smaller than 0.75" in width and height.

Figure 1:
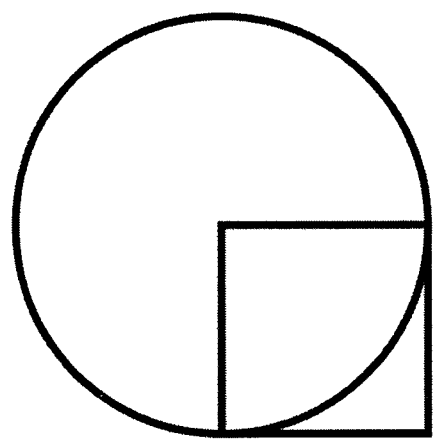
FIG. 1 shows the components and overall design of a qyoo, according to an aspect of the present disclosure.

FIG. 1 shows the components and overall design of a qyoo (pronounced "cue"). A qyoo is a shape consisting of a circle with radius r, and a square having sides of lengths equal to r, positioned by default state in the lower right-hand corner of the circle. This describes the typical layout—however, the qyoo may be rotated and displayed in any two-dimensional angle. The upper left corner of the square in the qyoo intersects with the absolute center of the circle.

In use, an image pattern recognition program can analyze an image that includes all or most of the qyoo, and recognize the pattern of the qyoo. The orientation of the qyoo is determined by the relative placement of the square in the circle (the pointed edge), as the proper orientation of the qyoo is with the corner of the square outside the circle being the lower right-hand corner of the qyoo.

Figure 2:
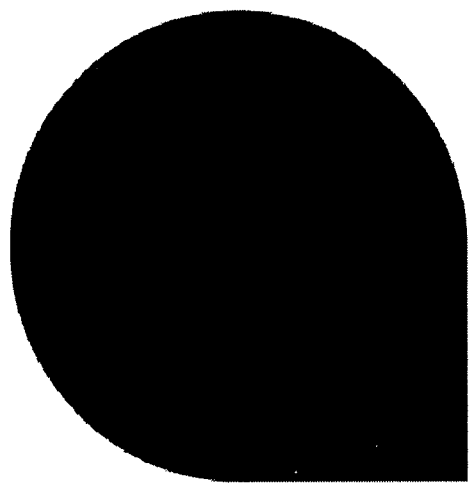
FIG. 2 shows the outline shape of a qyoo, according to an aspect of the present disclosure.

FIG. 2 shows the outline shape of a qyoo. As shown, the outline of a qyoo forms three fourths of a circle with radius r and one half of a square with sides of length r. The outline forms the equivalent shape that would be formed by aligning and overlaying a square with sides of length r as described above with one corner aligned with the center of the circle with radius r.

Figure 3:
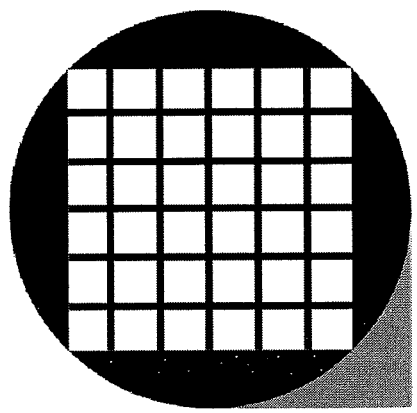
FIG. 3 shows a six-by-six grid in a qyoo, according to an aspect of the present disclosure.

FIG. 3 shows a six-by-six grid in a qyoo. The six-by-six grid in the qyoo is an arrangement in which substantive encoded data can be provided as described herein. The grid is centered within the circle, and the overall square formed by the six-by-six grid is the maximum sized square that can be contained within the circle. As the corners of the overall square formed by the six-by-six grid touch the circle of the qyoo itself, the length of each side of the overall square formed by the six-by-six grid is the square root of 2 times r squared (i.e., $\sqrt{2(r)^2}$ centered within the circle (the maximum sized square that can be contained within the circle). That is, each side of the overall square formed by the six-by-six grid is the hypotenuse of a right triangle formed by two radius segments of the circle reaching two adjacent corners of the overall square formed by the six-by-six grid. Therefore, the length of each side of the overall square is found by the well-known formula for determining the length of the hypotenuse of a right triangle (i.e., $\sqrt{2(r)^2}$).

Figure 4:
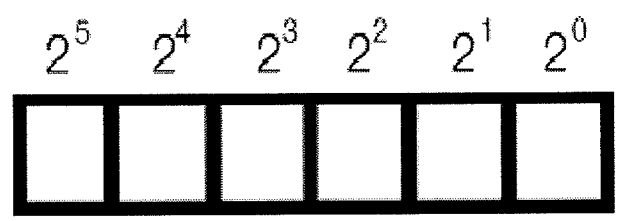
FIG. 4 shows a single row of the grid in the qyoo, according to an aspect of the present disclosure.

FIG. 4 shows a single row of six elements of the grid in the qyoo. Each square can be filled (representing a 1) or unfilled (representing a 0) in order to create a binary number. In the example shown in FIG. 4, a square element is substantially, but not entirely filled with a solid oval. However, in other embodiments not shown, individual square elements may be filled partially with shapes other than an oval, or filled even entirely. So long as the difference between whether an individual square element is blank or filled partially or entirely can be determined, a binary value (0 or 1) can be represented in each individual square element. That is, from left to right, the six individual square elements can be used to represent substantive values of 32 or 0, 16 or 0, 8 or 0, 4 or 0, 2 or 0 and 1 or 0, so a total of 64 values (i.e., 0 to 63) can be represented. Therefore, any subset of the 64 total achievable values can be used to represent 64 or fewer values. Used together, the six rows of the grid—each with six square element values—can represent an exponentially larger field of achievable values than the 64 values achievable by the square element values of a single row (up to a total of 2^36−1 or 68,719,476,735 possible combinations).

Figure 5:
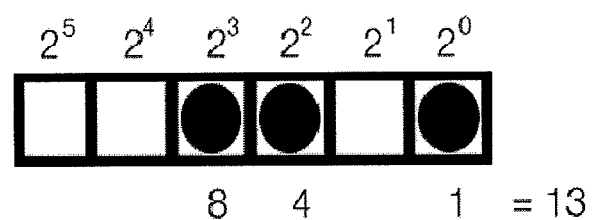
FIG. 5 shows an example of a six character code, represented by binary code, and how the six character code appears in a row of a grid in a qyoo, according to an aspect of the present disclosure.

FIG. 5 shows an example of a six character code, represented by binary code, and how the six character code appears in a row of a grid in a qyoo. In the example of FIG. 5, the an oval is filled in the third, fourth and sixth values of the row of the grid in the qyoo. The third square element carries a positive value of 8, the fourth square element carries a positive value of 4, and the sixth square element carries a positive value of 1. Accordingly, the row shown in FIG. 5 carries a total value of 13, at least when considered in isolation from the other five rows of the six-by-six grid of a qyoo.

Figure 6:
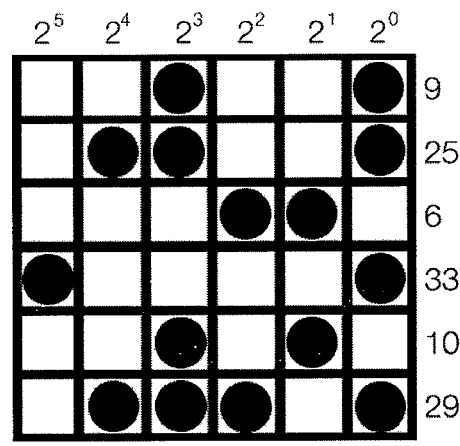
FIG. 6 shows an example of a qyoo and data representation within the six-by-six grid in the qyoo, according to an aspect of the present disclosure.

FIG. 6 shows an example of a qyoo and data representation within the six-by-six grid in the qyoo. In the six-by-six grid of FIG. 6, the six rows in order represent values of 9, 25, 6, 33, 10 and 29.

Figure 7:
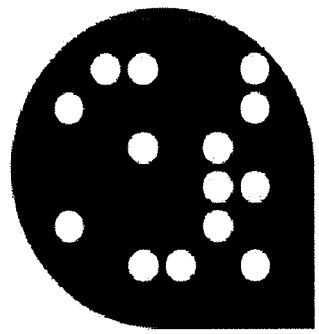
FIG. 7 shows an example of a qyoo in white on black, according to an aspect of the present disclosure.

FIG. 7 shows an example of a qyoo in white on black. In the example of FIG. 7, the data values for the second, third and sixth elements of the first row in a six-by-six grid are highlighted in white. The total data value for the first row is therefore 16+8+1=25. The total data value for the second row is 32+1=33, the third row is 8+2=10, the fourth row is 2+1=3, the fifth row is 32+2=34, and the sixth row is 8+4+1=13.

Figure 8:
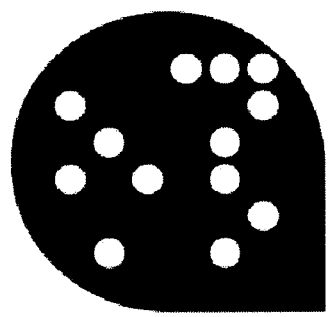
FIG. 8 shows another example of a qyoo in white on black, according to an aspect of the present disclosure.

FIG. 8 shows another example of a qyoo in white on black. The total data value for the first row in a six-by-six grid is 4+2+1=7, the second row is 32+1=33, the third row is 16+2=18, the fourth row is 32+8+2=42, the fifth row is 1=1 and the sixth row is 16+2=18.

Figure 9:
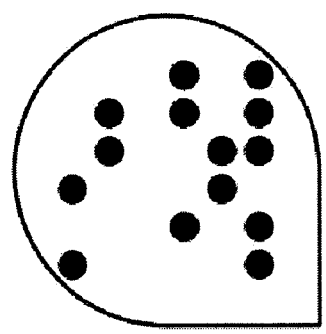
FIG. 9 shows an example of a qyoo in black on white, according to an aspect of the present disclosure.

FIG. 9 shows an example of a qyoo in black on white. The total data value for the first row in a six-by-six grid is 4+1=5, the second row is 16+4+1=21, the third row is 16+2+1=19, the fourth row is 32+2=34, the fifth row is 4+1=5 and the sixth row is 32+1=33.

For FIGS. 1-9, the focus of the discussion above has been on the ability of a symbol of a qyoo to be both recognizable, similar to a trademark, and to carry meaningful data. In the following discussion, the use of a qyoo will be described in the context of methods and devices that are specifically configured to operate by recognizing and interpreting a qyoo or operating/interoperating with devices that recognize and interpret a qyoo.

Figure 10:
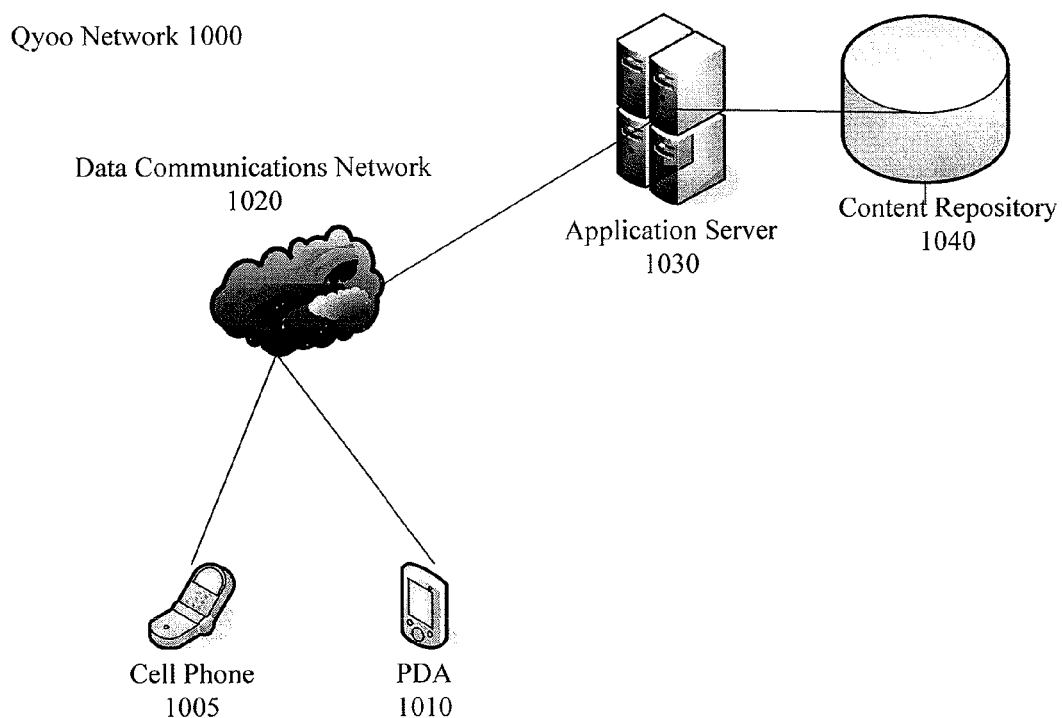
FIG. 10 shows an exemplary network in which the data in a qyoo is used to retrieve content.

FIG. 10 shows an exemplary network in which data in a qyoo is used to retrieve content. The network shown in FIG. 10 includes a cell phone 1005, a personal digital assistant (PDA) 1010, or a tablet (not shown) as end user devices ("mobile devices"). These devices are merely exemplary, but represent individual user devices that are provided with both imaging capabilities (camera) and communications capabilities. The mobile devices 1005, 1010 have at least one tangible physical processor that processes data and software application instructions as described herein. The mobile devices 1005, 1010 also have a tangible non-transitory memory that stores data and software application instructions as described herein. When executed, software instructions executed by such a processor and stored in such a tangible non-transitory memory perform aspects of the methods performed by the mobile devices 1005, 1010 as described herein.

In FIG. 10, the mobile devices 1005, 1010 communicate with an application server 1030 through a data network. The application server 1030 retrieves content from a content repository 1040. In this way, the mobile devices 1005, 1010 can each retrieve a qyoo software application from the application server 1030. Further, the mobile devices 1005, 1010 can run the qyoo software application, and retrieve content corresponding to the substantive data in a qyoo from a content repository 1040 via the application server 1030 when the qyoo application is run and recognizes a qyoo in a captured image. That is, when activated, the qyoo software application is used to read an image taken by the camera of the mobile devices 1005, 1010. The qyoo software application may first recognize the qyoo shape outline of three fourths of a circle and one half of a square, and then recognize the proper orientation of the qyoo by the corner of the square that is outside of the bounds of the circle. As noted above, the corner of the square outside of the bounds of the circle indicates the lower right corner of the qyoo, and this alignment then allows for proper reading of the data values in the six-by-six grid of the qyoos shown in the examples described above.

The qyoo software application may be retrieved from a known application source, such as an online "store" provided by a computer and/or phone company that encourages third parties to develop applications for use by the company's computers and/or phones. Once downloaded to the mobile devices 1005, 1010 shown in FIG. 10, the qyoo software application can be used to analyze an image taken or otherwise stored on the mobile devices 1005, 1010. The qyoo software application is then used to read the data in a recognized qyoo, and then act in accordance with the substantive meaning of the data.

As an example, a qyoo may be a provided in an advertisement for a car. The advertisement may be provided by any medium that can be captured in an image, such as a magazine, a billboard, a storefront, or on the side of a public vehicle. The qyoo may be provided alone, or in association with an advertisement.

A user with mobile devices 1005, 1010 as shown in FIG. 10 takes an image of the qyoo and activates, either before or after taking the image, the qyoo software application. The qyoo software application will request which image the user wants to activate, and then analyzes the image indicated by the user. Alternatively, the qyoo software application may be activated before the image is taken, and may control the mobile devices 1005, 1010 to take the image so that the qyoo software application automatically analyzes the image immediately after the image is captured.

In any event, the qyoo software application analyzes the image, recognizes the qyoo in the image, and then determines the proper orientation of the qyoo so that data in the qyoo can be read. Afterwards, the qyoo software application reads the data in the six-by-six grid, and proceeds in accordance with the substantive meaning of the data in the qyoo.

As an example, the qyoo may contain data that will direct mobile devices 1005, 1010 to retrieve and display one or more images or videos from the content repository 1040 via an application server 1030 or cloud-based series of servers. Alternatively, the qyoo may contain data that will direct a browser application on the mobile devices 1005, 1010 to visit a website. Thus, the mobile devices 1005, 1010 may be controlled by the qyoo software application in accordance with the substantive data in a six-by-six grid in a qyoo. Resultingly, the mobile devices 1005, 1010 can be used for supplemental advertising in the event that a qyoo is placed in an advertisement.

The qyoo may also be used to retrieve explanatory information for a product after purchase. For example, the qyoo may be provided on a kitchen appliance, as a form of invitation for a purchaser to visit a website in the event that information about the kitchen appliance is needed by the user after purchase. The qyoo may lead the qyoo software application to control the mobile device to visit a website, or retrieve and display images, videos or audio content.

Figure 11:
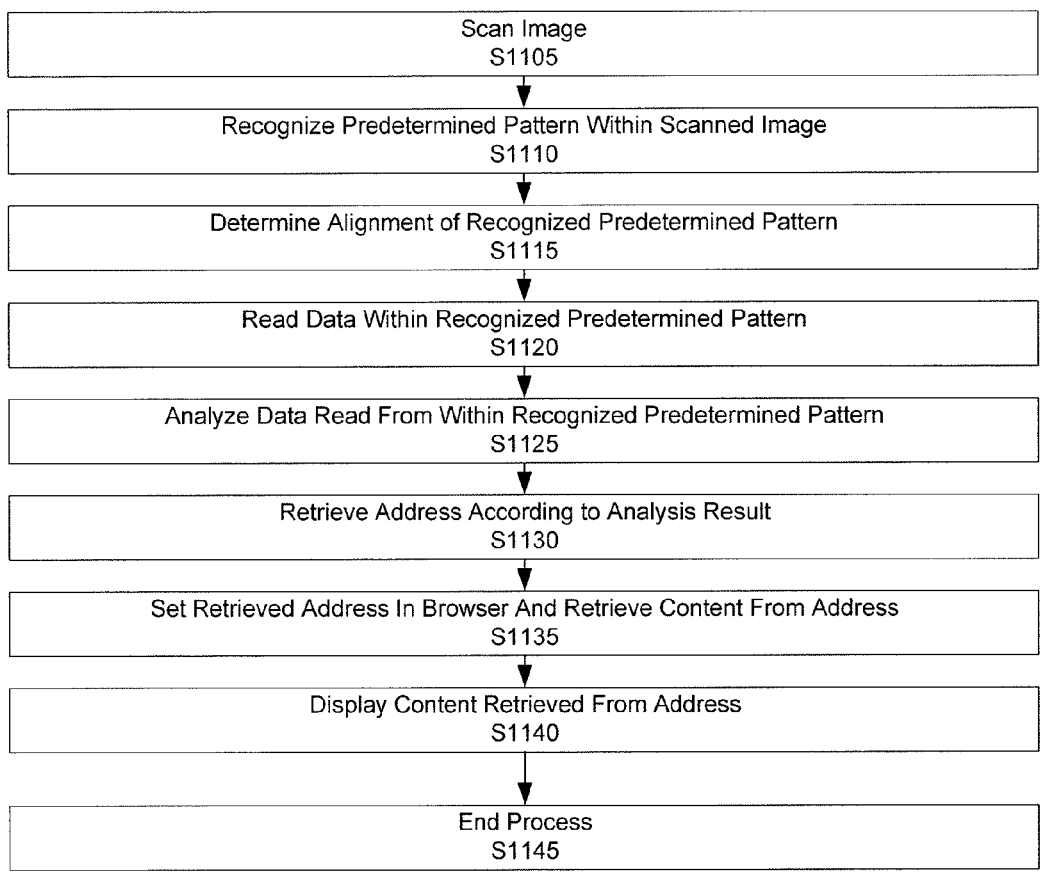
FIG. 11 shows an exemplary method of retrieving content over a network according to data in a qyoo.

FIG. 11 shows an exemplary method of retrieving content over a network according to data in a qyoo.

In FIG. 11, the method begins at S1105 when an image is scanned by, e.g., the mobile devices 1005, 1010 shown in FIG. 10. The predetermined shape in the scanned image is recognized at S1110, and then the alignment of the predetermined shape is recognized at S1115 so that data in the predetermined shape can be properly read and interpreted. Data in the predetermined shape is then read at S1120, and analyzed at S1125. An address is retrieved from the data at S1130 according to the analysis results, and set in the browser at S1135. Content is retrieved from the address at S1135, and the retrieved content is displayed at S1140.

For example, content is retrieved from the address at S1135. Mobile device 1005 or 1010 request and download the content from the address based on the data read from the pattern at S1120. In one of the examples described above, a script found at the address is the content, and is run on the mobile device, 1005 or 1010, which then simply returns another address such as an internet uniform resource locator (URL) address of a website. In other cases, the script retrieved at the address details a list of content assets (such as text, images, audio, and/or video), as well as events in which to play, animate, or use the content assets as touchable/clickable buttons. Additional content assets are then downloaded from media servers based on the script. Once the script and the content assets are downloaded to the mobile device, the retrieved content is then displayed at S1140, visually and/or audibly, as appropriate for that specific mobile device. Alternatively, the browser may visit a website according to an address stored in the script. After displaying the content retrieved from the media servers or visiting the website address stored in the script, the process in FIG. 11 ends at S1145.

Variability of Aspects of the Present Disclosure

The formation of the qyoo using three fourths of a circle and one half of a square is described herein. However, other designs are suitable for recognition by image pattern recognition software and devices in other embodiments.

A six-by-six grid for holding data is described herein. However, x-by-y grids, or x-by-x grids with fewer or more than 6 rows may be substituted in other embodiments.

Several uses for a qyoo are described herein, such as placement on advertisement mediums or on objects for use in retrieving information after sale of the objects. However, the qyoo or similar mechanisms for making data recognizable and retrievable using software may be used in any environment in which a user with a mobile device may wish to obtain information over a network in relation to a specified object. Applications such as "augmented reality" applications will also be possible with these shapes, because of the innate qyoo design.

A mobile device is described herein as devices with joint capabilities for capturing images and communicating over a network. However, the qyoo or similar mechanisms may be captured in an image and used to retrieve information over a network using other devices equipped with image-capturing and network-communication capabilities and components.

An application to be downloaded on a mobile device for recognizing and analyzing a qyoo, and retrieving data based on the information in the qyoo, is described herein as being retrieved downloaded over a network from, e.g., an online store provided by a device manufacturer. However, a device may be sold with a qyoo software application already installed, or the qyoo software application or a similar software application may be provided on a portable memory which can be read by the device with the image-capturing and network-communication capabilities and components.

A mobile device as described herein may include a circuit board which controls the logic for the device, an antenna by which information is transmitted to and from the device over the network, a liquid crystal display (LCD) for displaying visual content to a user, a charge coupled device or similar device for capturing an image when instructed to do so by a user, a keyboard by which a user can enter and select information, a microphone for capturing audible content from a user, a speaker for presenting audible content to a user, and a battery for storing power used to power the device. The circuit board may include a digital signal processor and microprocessor as known in the field of mobile communications devices.

Figure 12:
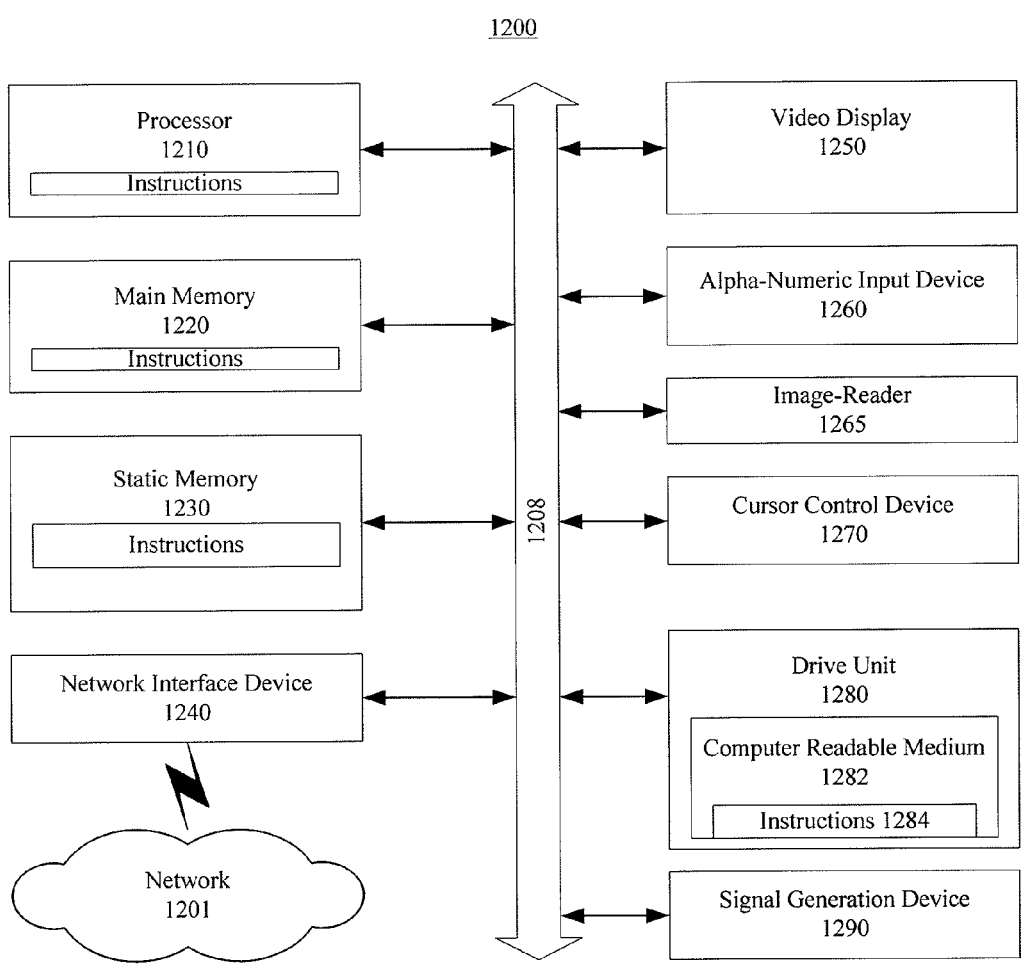
FIG. 12 shows an exemplary general computer system that includes a set of instructions for processing a qyoo as described herein.

FIG. 12 is an illustrative embodiment of a general computer system that includes a set of instructions for processing a qyoo as described herein. The general computer system is shown and is designated 1200. The computer system 1200 can include a set of instructions that can be executed to cause the computer system 1200 to perform any one or more of the methods or computer based functions disclosed herein. The computer system 1200 may operate as a standalone device or may be connected, for example, using a network 101, to other computer systems or peripheral devices. For example, the computer system 1200 may include or be included within any one or more of the computers, servers, systems, or communication networks described herein.

In a networked deployment, the computer system may operate in the capacity of a server or as a client user computer in a server-client user network environment, or as a peer computer system in a peer-to-peer (or distributed) network environment. The computer system 1200, or portions thereof, can also be implemented as or incorporated into various devices, such as a cell phone 1005, a personal digital assistant (PDA) 1010, an application server 1030, or any other machine capable of executing a set of instructions (sequential or otherwise) that specify actions to be taken by that machine. In a particular embodiment, the computer system 1200 can be implemented using electronic devices that provide voice, video and/or data communication. Further, while a single computer system 1200 is illustrated, the term "system" shall also be taken to include any collection of systems or subsystems that individually or jointly execute a set, or multiple sets, of instructions to perform one or more computer functions.

As illustrated in FIG. 12, the computer system 1200 may include a processor 1210, for example, a central processing unit (CPU), a graphics processing unit (GPU), or both. Moreover, the computer system 1200 can include a main memory 1220 and a static memory 1230 that can communicate with each other via a bus 1208. As shown, the computer system 1200 may further include a video display unit 1250, such as a liquid crystal display (LCD), an organic light emitting diode (OLED), a flat panel display, a solid state display, or a cathode ray tube (CRT). Additionally, the computer system 1200 may include an alpha-numeric input device 1260, such as a keyboard, another input device (not shown), such as a remote control device having a wireless keypad, a keyboard, a microphone coupled to a speech recognition engine, a camera such as a video camera or still camera, and a cursor control device 1270, such as a mouse. The computer system 1200 can also include a disk drive unit 1280, a signal generation device 1290, such as a speaker or remote control, and a network interface device 1240. The computer system 1200 also has an image-reader 1265, such as a camera CCD and related components provided for a cell phone or personal digital assistant (PDA).

In a particular embodiment, as depicted in FIG. 12, the disk drive unit 1280 may include a computer-readable medium 1282 in which one or more sets of instructions 1284, e.g. software, can be embedded. A computer-readable medium 1282 is a tangible article of manufacture, from which sets of instructions 1284 can be read. Further, the instructions 1284 may embody one or more of the methods or logic as described herein. In a particular embodiment, the instructions 1284 may reside completely, or at least partially, within the main memory 1220, the static memory 1230, and/or within the processor 1210 during execution by the computer system 1200. The main memory 1220 and the processor 1210 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations, or combinations thereof.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 1282 that includes instructions 1284 or receives and executes instructions 1284 responsive to a propagated signal, so that a device connected to a network 1201 can communicate voice, video or data over the network 1201. Further, the instructions 1284 may be transmitted or received over the network 1201 via the network interface device 1240.

Methods described herein are not methods solely performed by humans, and are typically performed using devices that operate in accordance with software programs stored on one or more computer-readable mediums. The term "computer-readable medium" herein includes a single medium or multiple media, and may be an independent tangible object such as a portable memory, or a tangible component of a tangible device or apparatus. A computer-readable medium may be one or more databases that store one or more sets of instructions. The term "computer-readable medium" also includes any medium that is capable of storing, encoding or carrying a set of instructions for execution by a processor or that cause a computer system to perform any one or more of the methods or operations disclosed herein.

In an exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any computer-readable medium or other equivalents and successor media, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A tangible mobile communications device, comprising:
   a tangible image-capturing element which captures images at the direction of a user of the device;
   a tangible processor that analyzes an image captured by the image-capturing element to determine whether a predetermined two-dimensional shape with an outline having a curved component is present in the image; that determines based on the outline an alignment of the predetermined two-dimensional shape when the predetermined two-dimensional shape is present in the image; and that reads data within the predetermined two-dimensional shape in accordance with the determined alignment;

a tangible communications transmitter that automatically forwards a request for content over a communications network in accordance with the data read within the predetermined two-dimensional shape; and a tangible communications receiver that receives the content over the network and displays the content using the tangible mobile communications device, wherein a grid is imposed within the outline such that presence of information in each of a plurality of components of the grid can be determined.

2. The tangible mobile communications device of claim 1, wherein the outline of the predetermined two-dimensional shape also has linear components.

3. The tangible mobile communications device of claim 2, wherein the curved component includes an outline of a circle segment.

4. The tangible mobile communications device of claim 3, wherein the curved component connects with an outline of an incomplete square.

5. The tangible mobile communications device of claim 2, wherein the alignment of the predetermined two-dimensional shape is determined from relative placement of the curved and linear components.

6. The tangible mobile communications device of claim 4, wherein the circle segment is a complete circle and the grid is imposed in the complete circle.

7. The tangible mobile communications device of claim 6, wherein the grid comprises multiple elements arranged in columns and rows.

8. The tangible mobile communications device of claim 7, wherein information present in elements arranged in a row is assigned values from most significant value to least significant value.

9. The tangible mobile communications device of claim 8, wherein the values of information present in elements in a row are summed to provide a value for the row.

10. The tangible mobile communications device of claim 9, wherein values for multiple rows are determined, and considered together to identify a unique value for the grid.

11. A method for obtaining content, comprising:

capturing, using a tangible image-capturing element of a device, images at the direction of a user of the device;

analyzing, using a processor of the device, an image captured by the image-capturing element to determine whether a predetermined two-dimensional shape with an outline having a curved component is present in the image;

determining, using the processor of the device and based on the outline, an alignment of the predetermined two-dimensional shape when the predetermined two-dimensional shape is present in the image; and reading, using the processor of the device, data within the predetermined two-dimensional shape in accordance with the determined alignment;

automatically forwarding a request for content over a communications network in accordance with the data read within the predetermined two-dimensional shape; and receiving the content over the network and displaying the content using the device, wherein a grid is imposed within the outline such that presence of information in each of a plurality of components of the grid can be determined.

12. The method of claim 11, wherein the outline of the predetermined two-dimensional shape also has linear components.

13. The method of claim 12, wherein the curved component includes an outline of a circle segment.

14. The method of claim 13, wherein the curved component connects with an outline of an incomplete square.

15. The method of claim 12, wherein the alignment of the predetermined two-dimensional shape is determined from relative placement of the curved and linear components.

16. The method of claim 14, wherein the circle segment is a complete circle and the grid is imposed in the complete circle.

17. The method of claim 16, wherein the grid comprises multiple elements arranged in columns and rows.

18. The method of claim 17, wherein information present in elements arranged in a row is assigned values from most significant value to least significant value.

19. The method of claim 18, wherein the values of information present in elements in a row are summed to provide a value for the row.

20. The method of claim 19, wherein values for multiple rows are determined, and considered together to identify a unique value for the grid.

* * * * *